Feb. 6, 1962 R. H. GUM 3,019,722
PRESS FOR FORMING TIED MEAT ROLLS
Filed Nov. 18, 1960 2 Sheets-Sheet 1
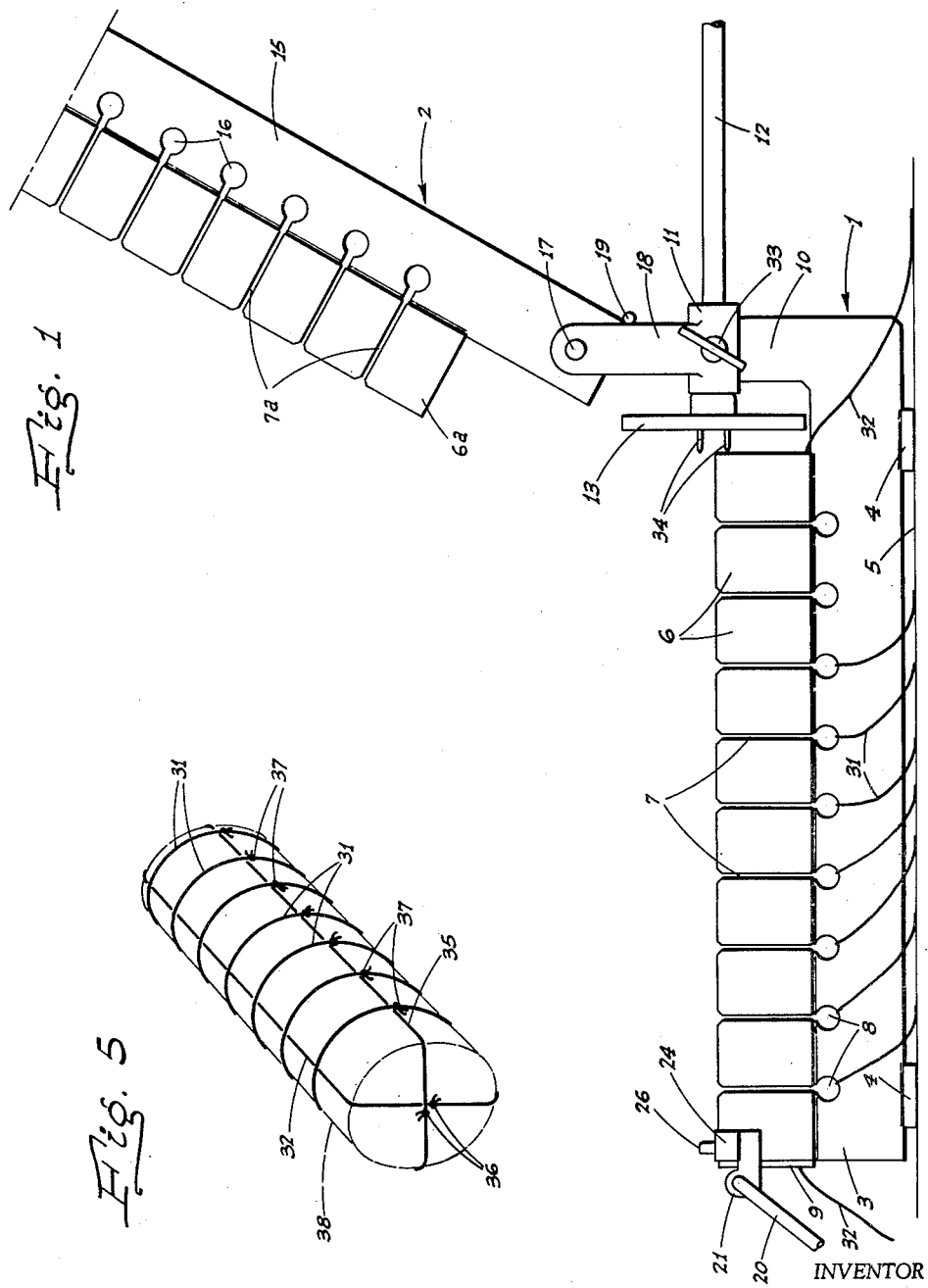
INVENTOR
Rowland H. Gum
BY Webster & Webster
ATTORNEYS

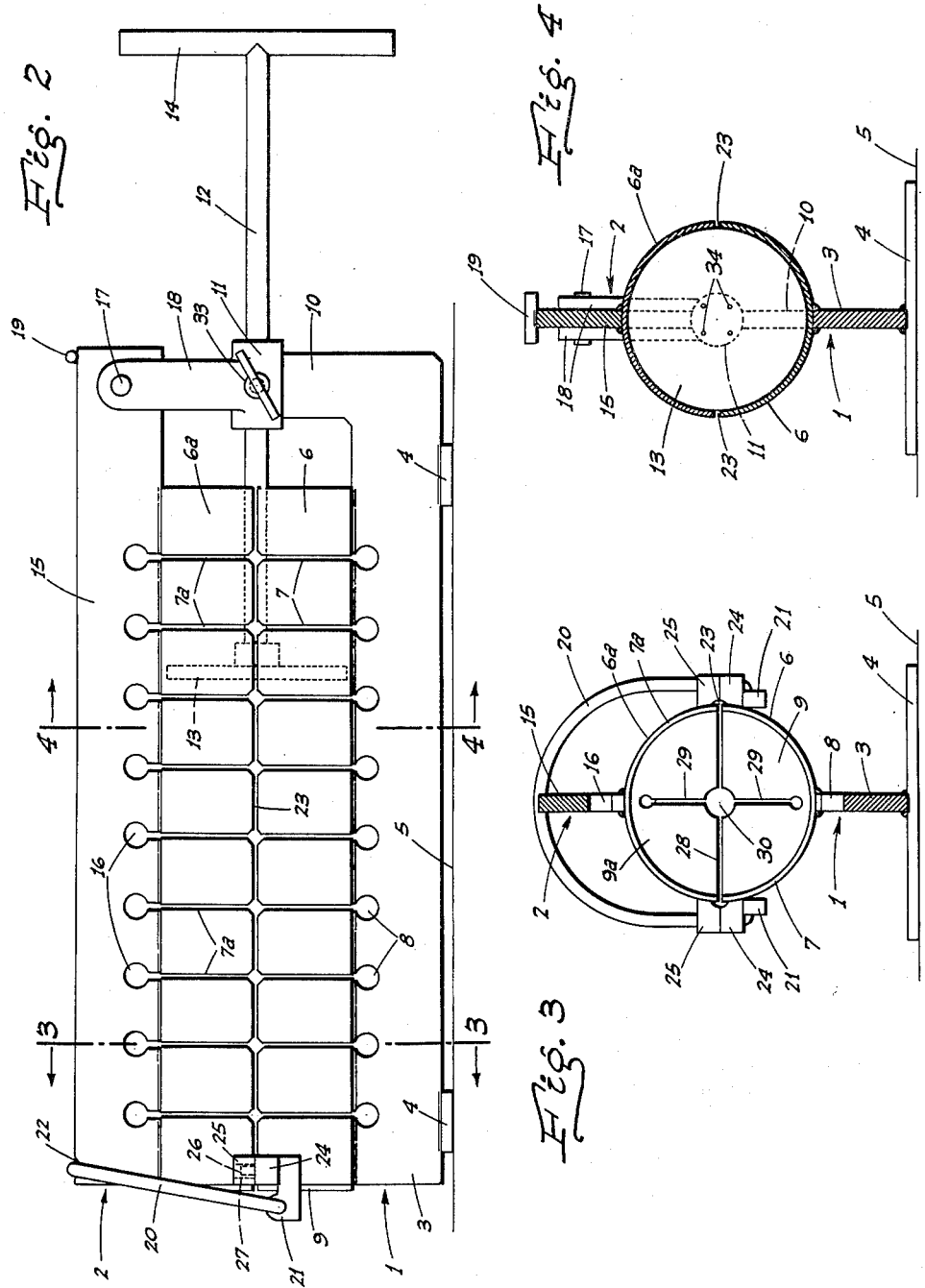

United States Patent Office 3,019,722
Patented Feb. 6, 1962

3,019,722
PRESS FOR FORMING TIED MEAT ROLLS
Rowland H. Gum, Modesto, Calif., assignor to San Joaquin Valley Turkey Growers' Association, Modesto, Calif., a non-profit cooperative association
Filed Nov. 18, 1960, Ser. No. 70,315
7 Claims. (Cl. 100—1)

This invention relates to a meat press, and particularly to one for forming a string-tied meat roll from an initially unshaped chunk or slab of meat, such as a deboned turkey, either one-half or the whole thereof.

While especially designed for forming a tied meat roll from deboned turkey, and is here described as used for such purpose, the device is well adapted for the production of tied meat rolls from other kinds of meat.

After the turkey has been deboned, by a method now known to the industry, the resultant slab of meat is formed by hand into a relatively loose roll with the skin outermost; the principal object of this invention being to provide a press to receive such initially loose roll and arranged so that the latter may be tightly compressed to a generally cylindrical form and then string-tied—against unrolling and expansion—before such roll is removed from the press.

A further object of the invention is to provide a press, for the purpose described, which is simple to operate both as to the loading and unloading of the press, the pressing of the meat, and the positioning and subsequent tyeing of the tie strings about the pressed meat roll.

It is also an object of the invention to provide a press for forming tied meat rolls which is designed for ease and economy of manufacture.

An additional object of the invention is to provide a practical, reliable, and durable press for forming tied meat rolls, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of the press with the mold open or in position to receive the meat to be pressed, or to enable the pressed and tied roll to be removed from the mold.

FIG. 2 is a side elevation of the press with the mold closed and with the pressing ram advanced.

FIG. 3 is a cross section on line 3—3 of FIG. 2.

FIG. 4 is a cross section on line 4—4 of FIG. 2.

FIG. 5 is a diagrammatic perspective view of the tied meat roll.

Referring now more particularly to the drawings and to the characters of reference marked thereon, the improved press comprises lower and upper units, indicated generally at 1 and 2, respectively; such units including mold halves, as hereinafter described, which together form a complete mold.

The lower and stationary unit comprises a longitudinal rigid base bar 3, preferably of rectangular relatively narrow form in section and set on edge. At intervals the bar is provided with transversely extending feet 4 by which to mount and secure the bar on a work bench or table 5.

Secured on, and projecting upwardly from, the upper edge of the bar 3 is the lower half 6 of the mold, and which is preferably of semi-circular form in section. This mold half is formed with a plurality of narrow, evenly spaced slots 7 therealong disposed in transverse vertical planes and extending unobstructedly about the mold half. At the bottom of said lower mold half 6 the slots 7 communicate with openings 8 in the bar 3 directly below said slots.

At its forward end the lower mold half 6 is closed by an end plate 9.

At the rear open end of the mold half 6 the bar 3 extends a short distance rearwardly beyond the same, and is provided with an upstanding ear 10 having a sleeve 11 on its upper end extending lengthwise and centrally of the complete mold. Slidable through the sleeve 11 is a rod 12 secured to the forward end of which is a plunger or ram 13 of a diameter to slidably fit said complete mold. At its rear end the rod 12 is provided with a handle 14. The space between the forward end of the sleeve 11 and the rear end of the mold half is sufficient to enable the plunger 13 to be withdrawn into said space and clear of the end of the mold, as shown in FIG. 1.

The upper unit 2 comprises an upper longitudinal rigid bar 15 of the same cross-sectional form as bar 3, and from the lower edge of which the upper semi-circular mold half 6a depends. This mold half is the same size as mold half 6, and is formed with transverse slots 7a corresponding to and alining with slots 7 when the mold is closed, as shown in FIG. 2. Slots 7a at the top communicate with openings 16 in the bar 15. The upper mold half 6a is closed at its forward end by an end plate 9a matching end plate 9.

The bar 15, at its rear end, is pivoted, as at 17, between ears 18 upstanding from sleeve 11 so that the upper mold half 6a may be swung upwardly from a horizontal position overlying and complementing the lower mold half 6, as shown in FIG. 2, to a rearwardly inclined position, as shown in FIG. 1. Such rearward inclination is limited by the engagement of a cross stop 19 on bar 15 at its rear end with the back edge of ears 18.

The upper press unit 2 is releasably held in its closed position by a swingable latch bail 20 pivoted at its lower end on ears 21 mounted on and projecting forwardly from the lower mold half 6 at the sides thereof. When swung up the bail is engageable with a notch 22 in the upper edge of bar 15 at its forward end.

When the mold halves are in a closed position, longitudinal narrow slots 23, one on each side of the mold, are left between the adjacent longitudinal edges of the mold halves 6 and 6a; said slots 23 communicating with the adjacent open ends of slots 7 and 7a. The position of pivot 17 relative to the lower mold half 6 determines the width of slots 23 at the rear end of the mold. At the forward end of the mold the width of said slots 23 is maintained so that they are parallel throughout their extent by the engagement of stop blocks 24 and 25 with each other; said blocks being secured on the sides of the lower and upper mold halves 6 and 6a, respectively, at the forward end thereof. Preferably, each block 24—which projects above the upper edge of mold half 6—is provided with an upstanding dowel 26 engageable in a socket 27 in the corresponding upper block 25. In this manner lateral deviation of the mold halves relative to each other when closed is positively prevented.

When the mold is thus closed, a transverse slot 28—substantially the same width as slots 23—is left between the end plates 9 and 9a, as shown in FIG. 3. The end plates are also each provided with a vertical slot 29 alined with each other and disposed diametrically of the mold; slots 28 and 29 thus intersecting each other at right angles. A relatively large circular opening 30 is formed in the end plates at the intersection of the slots.

In operation, the upper unit 2 is first swung up to open the mold and the plunger 13 is retracted. Cross tie strings 31 are then placed through slots 7 and allowed to rest in the bar openings 8 below; the length of these strings being greater than the circumference of the mold. A longitudinal tie string 32 is dropped through slot 29 and then extended along the bottom of the lower mold half 6 and projected from the open end thereof and clear of the plunger, as indicated in FIG. 1. The length of this string is sufficient for it to extend completely about the periphery of the mold lengthwise thereof.

Thereafter, the initially hand formed, relatively loose roll of meat is placed in the lower mold half 6 and the rear end portion of the string 32 is then raised up against the rear end of the roll of meat and thence extended forwardly centrally thereover to and beyond the forward end of said roll and mold. The plunger 13 is then advanced until it initially contacts the roll; being held at the point of advance by means of a finger-actuated clamping screw 33 mounted in sleeve 11 and engaging rod 12.

When so advancing the plunger, care is taken to see that the adjacent upwardly projecting portion of string 32 is guided between a set of vertically and transversely spaced guide pins 34 projecting forwardly from the plunger 13 centrally thereof so as to locate and maintain said portion of the string centrally of the roll of meat.

A string 35, which forms the horizontal tie about the meat roll, when compressed, is then placed about the upper edge of the mold half 6 and about the rear end of the roll; being disposed and guided at such end between the vertically spaced ones of the pins 34. As the meat, at such stage, is relatively soft the string 35 can be readily forced below the topmost pins 34 so as to occupy said guided position. The free forward ends of string 35 project from the front end of the mold; being prevented from lateral displacement at such end by the upstanding portions of the blocks 24 which extend above the upper edges of the mold half 6 as previously described.

Nextly the unit 2 is lowered onto the lower unit 1 to close the mold, and is latched in place by suitable manipulation of the bail 20. The plunger 13, with clamping screw 33 released, is then forcefully pressed forwardly to solidly pack or compress the meat roll. During such movement the strings 32 and 35 may be pulled forwardly at their free ends to take out the slack as it occurs.

When the meat roll has been compressed to the desired degree the plunger is locked against retraction by the screw 33. The strings 32 and 35 are then separately pulled tight about the compressed meat roll and tied tightly at the circular opening 30; such knots being indicated at 36 in FIG. 5.

The transverse strings 31 are then passed about the mold; being disposed in the slots 7 and 7a so as to engage the meat roll exposed in said slots. The bar openings 16 of course facilitate the "threading" of strings 31 from one side to the other of the bar 15. Said strings 31 are then drawn tightly about the meat roll and their ends are tied together as at 37.

The compresed meat roll is thus held under pressure and against disintegration or expansion by the various longitudinally and transversely extending strings.

After the various knots are tied, the ends thereof are trimmed; the latch is released; the plunger 13 is retracted somewhat; the upper unit 2 is swung up; and the exposed and compressed meat loaf, indicated at 38, is removed.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A meat roll press comprising lower and upper units, the lower unit comprising a rigid longitudinal bar arranged to be mounted in a fixed position and a lower meat-receiving mold half mounted on the upper edge of and upstanding from the bar and closed at its forward end; the upper unit comprising a longitudinal rigid bar and an upper mold half mounted on and depending from the lower edge of the last named bar and closed at its forward end, means pivoting the bars together at their rear ends and beyond the mold halves for opening and closing movement of said halves, said upper mold half cooperating with the lower mold half when the mold is closed; means to releasably secure the mold halves in closed position, and a plunger arranged to enter the rear end of the mold and compress the meat therein when said mold is closed.

2. A press, as in claim 1, in which each mold-half is formed with transversely extending longitudinally spaced slots open to the lower edges of such mold-half; the different slots alining with each other in transverse vertical planes when the mold is closed and each bar being formed with openings therethrough adjacent the related mold half and in communication with the corresponding slots.

3. A press, as in claim 1, in which each mold-half is formed with transversely extending longitudinally spaced slots open to the lower edges of such mold half; the different slots alining with each other in transverse vertical planes when the mold is closed; and means is provided to leave a continuous horizontal slot along each side of the mold between the mold halves and across the mold at its closed end when the mold is closed.

4. A press, as in claim 1, in which each mold-half is formed with transversely extending longitudinally spaced slots open to the lower edges of such mold half, the different slots alining with each other in transverse vertical planes when the mold is closed; and means is provided to leave a longitudinal slot along each side of the mold between the mold halves and across the mold at its closed end when the mold is closed, said means including cooperating stop blocks secured on the sides of the mold halves at the forward ends thereof; the lower ones of said blocks projecting above the upper edges of the related mold half.

5. A meat roll press comprising an elongated mold which includes upper and lower mold halves, means connecting the hold halves for relative opening and closing movement, and an end plate unit closing one end of the mold when the mold halves are in closed relation; there being a continuous horizontal slot between the mold halves along the opposite sides thereof and across the end plate unit, and the mold halves being formed with a plurality of continuous longitudinally spaced transverse slots thereabout, corresponding slots being alined with each other in the upper and lower mold halves and all communicating with the side portions of the longitudinal slot; all said slots being exposed throughout their extent to the exterior of the mold.

6. A meat roll press comprising an elongated mold which includes upper and lower mold halves, a rigid bar extending along the top of and secured to the upper mold half, a rigid bar extending along the bottom of and secured to the lower mold half, the bars being exteriorly of the related mold halves, and means connecting the bars for opening and closing movement of the mold halves; said mold halves being formed with a plurality of continuous longitudinally spaced transverse grooves thereabout, corresponding slots being alined with each other in the upper and lower mold halves and all extending to the longitudinal edges of the mold halves and being exposed throughout their extent to the exterior of the mold.

7. A mold, as in claim 6, in which the lower bar is formed with openings therethrough communicating with the corresponding slots.

References Cited in the file of this patent

UNITED STATES PATENTS

| | | |
|---|---|---|
| 58,779 | Cooley | Oct. 16, 1866 |
| 261,984 | Baxter | Aug. 1, 1882 |
| 566,976 | Forder | Sept. 1, 1896 |
| 586,414 | Betty | July 13, 1897 |
| 775,181 | Kent | Nov. 15, 1904 |
| 1,177,168 | Borbash | Mar. 28, 1916 |